United States Patent [19]

Macchiarolo et al.

[11] 4,297,224
[45] Oct. 27, 1981

[54] METHOD FOR THE CONTROL OF BIOFOULING IN RECIRCULATING WATER SYSTEMS

[75] Inventors: Nick T. Macchiarolo; Billy G. McGuire; John M. Scalise, all of El Dorado, Ark.

[73] Assignee: Great Lakes Chemical Corporation, West Lafayette, Ind.

[21] Appl. No.: 156,508

[22] Filed: Jun. 4, 1980

[51] Int. Cl.$^3$ .......................... C02F 1/76; C02F 1/50
[52] U.S. Cl. .................................................. 210/755
[58] Field of Search ...................... 210/62, 753–756, 210/764, 765

[56] References Cited

U.S. PATENT DOCUMENTS

| | | | |
|---|---|---|---|
| 2,184,888 | 12/1939 | Muskat et al. | 23/190 |
| 2,430,233 | 11/1947 | Magill | 252/187 |
| 3,000,940 | 9/1961 | Raasch | 210/62 |
| 3,136,598 | 6/1964 | Kokorudz | 210/62 |
| 3,147,219 | 9/1964 | Paterson | 210/62 |
| 3,201,311 | 8/1965 | Antonides | 210/62 |
| 3,296,069 | 1/1967 | Kowalski | 210/62 |
| 3,326,747 | 6/1967 | Ryan | 210/62 |
| 3,346,446 | 10/1967 | Zsoldas | 210/62 |
| 3,412,021 | 11/1968 | Paterson | 210/62 |
| 3,496,269 | 2/1970 | Thompson | 210/62 |
| 4,119,535 | 10/1978 | White | 210/62 |

OTHER PUBLICATIONS

Betz Handbook of Industrial Water Conditioning, Seventh Edition, 1976, pp. 202–208 and 220–225.
Chemical Abstracts 89-168920(20) Japanese Kokai No. 78 34,923–Shimizu, et al. "Sterilizing Agent For Industrial Water".
Chemical Abstracts 87-5841(8) German Offenleggenschrift No. 2,550,828–Ovchinnikov, et al. "Bactericidal Composition".
Picologlou, et al., "Biofilm Growth and Hydraulic Performance", Journal of the Hydraulics Division, Proceedings of the American Society of Civil Engineers, vol. 106, No. HY 5, May 1980.
Characklis, et al., "Fundamental Considerations in Biofouling Control", presented at the Cooling Tower Institute Annual Meeting, Houston, Texas, Technical Paper No. 221A.
Thompson, et al., "Power Plant Operations and the Role of Condenser Tube Biofouling", presented at the Condenser Biofouling Control Symposium, Electric Power Research Institute, Atlanta, Georgia.
Bryers, et al., "Measurement of Primary Biofilm Formation", presented at Condenser Biofouling Control Symposium, Electric Power Research Institute, Atlanta, Georgia.
Characklis, "Biofouling Film Development and Its Effect on Energy Losses: A Laboratory Study", presented at Condenser Biofouling Control Symposium, Electric Power Research Institute, Atlanta, Georgia.
Characklis, et al., "Biofilm Development and Destruction in Turbulent Flow", presented at Cooling Tower Institute 1979 Annual Meeting (Technical Papaer No. TP 204A.)
Carter, et al., "Microbiological Control of Cooling Waters", presented at the Cooling Tower Institute Annual Meeting, Jan., 1979 (Technical Paper No. TP197A.)
Naidenova, et al., "Study of New Preparations for the Sanitation and Treatment of Technological Equipment", Konservn. Ovoshchesush. Prom–st. 1978 (10), 23–6 (Chemical Abstracts 90-28986 (4).
Holland, et al., "Help Maintain High Efficiency by Cleaning Steam Condensers Continuously, On–Line", Power, Jun., 1978.
Norrman, et al., "Control of Microbial Fouling in Circular Tubes with Chlorine", Development in Industrial Microbiology vol. 18, Ch. 48.
Schultz, "Evolution of Non–Polluting Microbiocides", presented at the Cooling Tower Institute, New Orleans, Louisiana (Technical Paper No. TP131A.).
Yost, "Microbiological Control in Cooling Water Systems", presented at the Cooling Tower Institute Annual Meeting, Jan., 1973 (Technical Paper No. TP119A).
NACE Cooling Water Treatment Manual, National Association of Corrosion Engineers, TPC Publication No. 1.
Kott, et al., "The Effect of Halogen on Algae–I Chlorella Sorokiniana", Water Research, 1969, vol. 3, pp. 251–256.
Betzer, et al., "Effect of Halogen on Algae–II Cladophoria Sp.", Water Research, 1969, vol. 3, pp. 257–261.
Kott, "The Effect of Halogen on Algae–III, Field Experiment", Water Research, 1969, vol. 3, pp. 265–271.
Mills, "Comparison of Bactericidal Properties of Halogens", presented at Symposium on Advanced Water Treatment of the National Swimming Pool Institute in Cleveland, Ohio.
Brown, "Fungus Control in Cooling Towers", presented at the Cooling Tower Institute Annual Meeting, New Orleans, Louisiana, Technical Paper No. TP6B.
Carlson, "Combating Biological Attack on the Gulf Coast", presented at the Cooling Tower Institute, Jan., 1963, Technical Paper No. TP4A.
Albright, "Liquid Bromine Removes Obstinent Algae from 10,000 gpm Tower for $2.10/Day", Petroleum Processing, vol. 3, pp. 421–422.

*Primary Examiner*—Ernest G. Therkorn
*Attorney, Agent, or Firm*—Kirkland & Ellis

[57] ABSTRACT

Biofouling in recirculating water systems may be controlled by admixing or otherwise providing 1-bromo-3-chloro-5, 5-dimethylhydantoin ("BCDMH") to the water at a level effective to control biological film-forming organisms and thereafter maintaining the BCDMH concentration at a level sufficient substantially to inhibit regrowth of such organisms.

6 Claims, No Drawings

METHOD FOR THE CONTROL OF BIOFOULING IN RECIRCULATING WATER SYSTEMS

BACKGROUND OF THE INVENTION

1. Field of the Invention

The present invention discloses a novel method for the substantial elimination of the major cause of biofouling in water circulating systems and, in particular, those systems circulating water for cooling purposes, such as, for example, water cooling towers, air conditioning systems, and the like.

2. Description of the Prior Art

Biological fouling of circulating cooling water systems is a common problem resulting from excessive growth and development of different types of lower plant life (e.g., algae, bacteria and fungi.) Circulating cooling water systems are excellent places for the incubation and growth of biological organisms because such systems contain nutrients (typically organic contamination) from air drawn into the system and from organic materials naturally occurring in the water. In addition, the water temperature in cooling towers is warm enough to provide an ideal incubation environment. Biological growth can foul pipelines, increase water circulating costs, cause and/or accelerate corrosion of metal, attack wood and substantially reduce heat transfer thereby contributing to decreased efficiency of the cooling tower system.

Common forms of microorganisms found in a cooling tower system include algae, slime-forming fungi and bacteria, wood destroying organisms, and sulfate reducing organisms along with many other forms of bacteria which may have little or no effect on cooling tower efficiency.

The present invention discloses a novel biological control agent, or biocide, which displays unexpected properties when used in a circulating water cooling system. However, in order to appreciate the effectiveness of the present invention, it is first appropriate to review the criteria which are generally applied in measuring biocide effectiveness.

Those skilled in the water treatment art have typically the following four factors in measuring biocide effectiveness in cooling water systems:
 (a) appearance;
 (b) microorganism count;
 (c) microscopic analyses; and
 (d) heat transfer.
Each of these methods will be briefly discussed.

a. Appearance

The most often used method for measuring biocide effectiveness is the one which is the most difficult to quantify and is the most subjective in nature (i.e., the appearance of a cooling tower and its associated heat transfer equipment.) In an attempt to quantify visual appearance, numerous checklists have been developed to guide an inspector in rating the cleanliness of a cooling water system and, indirectly, the effectiveness of biocide agents used in that system. Such checklists include visual inspection of several areas of the cooling tower system, such as the distribution deck, distribution nozzles, fill material, structural members, air louvers, drift eliminators, basin, and pump screens. Efficiency criteria are based, for example, on observations of whether all surfaces are clearly visible with no slimy feel-clean tower; whether a portion of the surfaces, such as for example, two-thirds of the surfaces, are free of visible growth, but may feel slimy-fair condition; or whether more than two-thirds of the observable surfaces are covered with biological growth or deposits, with the deposits being hard to remove with the fingertips-dirty tower.

b. Microorganism Count

A second technique in measuring the effectiveness of biocidal agents is to measure the microorganism count in the bulk water phase of a system (typically in units of microorganisms per milliliter of water). However, the experience of the inventors herein have shown this method to be extremely unreliable as a field measurement tool. Good biological laboratory techniques require that the plate counts be initiated very quickly after samples are taken since the microorganisms are living systems. In practice it is common to take samples, fix the samples with a thiosulfate solutions, and then mail the fixed samples to a central laboratory for plate counts. Because transit times and transit conditions substantially effect the growth cycle of microorganisms in a particular sample, plate counts made in this manner are unreliable. In addition, field studies have been conducted which show that plate counts made within four hours after sampling had little correlation to the physical appearance of the cooling towers being tested. On occasion, cooling towers that were physically clean had extremely high bacteria counts while cooling towers that were much dirtier had very low bacteria counts.

c. Microscopic Analysis

A third method of measuring biocide effectiveness is microscopic identification and observation of the microbial populations in a cooling tower system. Although potentially useful in determining the predominant biological species in a given water system, this method of measuring biocide performance requires the availability of trained personnel and fresh samples from the cooling tower. For field use, this technique is not considered a practical method of measuring biocide effectiveness.

d. Heat Transfer

The fourth common measurement of biocide performance is the measurement of heat transfer or temperature differential (hereinafter "$\Delta T$") across a cooling tower or heat exchanger. This method quickly defines the existence of fouling problems where a noticeable reduction in $\Delta T$ is observed. This method has the disadvantage of not identifying the specific problems involved, such as changes in water flow, oil fouling, mineral deposition, and/or microbiological fouling.

While the foregoing methods of measuring the effectiveness of biocide agents provide some indication as to their efficiency, it is generally desirable that a biocide meet the following criteria:
 (1) Wide kill spectrum—the agent should be effective against a wide variety of microorganisms, such as, for example, algae, bacteria, fungi, mold and other aquatic organisms;
 (2) fast rate of kill;
 (3) low cost;
 (4) useful in wide pH ranges;
 (5) non-corrosive to metals and wood;

(6) compatible with commonly used cooling water treatment chemicals such as scale inhibitors and corrosion inhibitors;

(7) uneffected by organic contaminants or nitrogen compounds in the water recirculating system;

(8) ease in handling and application; and (9) capable of obtaining appropriate federal and state governmental agency approval.

Biocides can be divided into two basic classifications: non-oxidizing biocides and oxiding biocides. In general, the non-oxidizing biocides function primarily by altering the permeability of the cell walls of the microorganisms and interfering with their biological processes. Common non-oxidizing biocides include organo-sulfur compounds, quaternary ammonium salts, chlorinated phenolics and heavy metal compounds.

Oxidizing biocides cause irreversible oxidation/hydrolysis of protein groups in the microorganism and in the polysaccharides that bind the microorganisms to the surfaces of the cooling tower equipment. The result of this process is a loss of normal enzyme activity and cell death.

Some of the more common biocides that have been proposed for cooling tower use include:

a. Non-Oxidizing Biocides (1) Organo-tin compounds, such as bis (tributyl-tin) oxide;

(2) Organo-sulfur compounds, such as methylene bis thiocyanate;

(3) Quaternary ammonium salts;

(4) Sodium pentachlorophenate;

(5) Copper salts, such as cupric sulfate;

(6) 2,2-dibromo-3-nitrilopropionamide (hereinafter "DBNPA").

b. Oxidizing Biocides (1) Chlorine;

(2) Bromine;

(3) Chloroisocyanurates;

(4) Chlorine dioxide;

(5) Hypochlorites;

(6) Bromine chloride and bromine-chlorine mixtures.

Each of these common biocides will be briefly discussed.

a. Non-Oxidizing Biocides (1) Organo-tin Compounds

The most common organo-tin compound is bis (tributyl-tin) oxide. This class of compounds is particularly effective against wood rotting organisms and slime-forming fungi. Their disadvantages are their relative ineffectiveness against bacteria and algae and their relatively slow rate of kill. These compounds are relatively toxic and non-biodegradable.

(2) Organo-sulfur Compounds

This class of compounds is represented by methylene bis thiocyanate ("MBT") and 3,5 dimethyl-tetrahydro-1,3,5-2H-thiodiazine-2-thione ("DMTT"). They are good slimicides and are widely used in the paper industry. They suffer from rapid decomposition above approximately pH 8.0, are relatively expensive and generally require a dispersant to obtain effective penetration of the biocide into the slime mass.

(3) Quaternary Ammonium Salts

Quaternary ammonium salts are widely used in cooling water systems and are typically represented by such products as alkyldimethylbenzylammonium chlorides. The quaternary salts are generally most effective against algae and bacteria in alkaline pH ranges but lose their activity in systems fouled with dirt, oil and other debris. Over-addition of these products can lead to extensive foaming thus resulting in reduced cooling efficiency.

(4) Sodium Pentachlorophenate and Other Chlorinated Phenolics

These products exhibit broad spectrum activity and are not generally affected by organic materials or most other impurities in the system. However, these products have, in general, become less popular because of concerns about federal, state and local regulations restricting discharges. In 1978 and 1979 most sodium pentachlorophenate biocides were withdrawn from the market because of environmental concerns.

(5) Copper Salts

Copper salts are highly effective against algae but are ineffective against molds and fungi. Copper sulfate, the most widely used product in this class, functions successfully at very low concentrations but most copper salts plate out on steel, leading to corrosion. These products are not usually recommended by suppliers for use in cooling tower systems.

(6) DBNPA

DBNPA is potent and highly effective against algae, fungi, and bacteria. However, because this biocide is pH sensitive, cooling water pH must be maintained below 8.0 to avoid rapid decomposition.

b. Oxidizing Biocides (1) Chlorine

Chlorine is probably the most common biocide in use for cooling tower treatment. It is generally an excellent algicide and bactericide, although some strains of bacteria can develop chemical resistance to chlorine. Often chlorine must be used in a shock treatment system to provide good biocide performance. Gas chlorination equipment is costly and generally requires a relatively large capital investment. Normal use levels must be dramatically increased to maintain effectiveness when cooling water has become contaminated with hydrocarbons, ammonia and organic material.

Excessive chlorine concentrations have an adverse effect on cooling tower wood. Chlorine becomes less effective as a biocide above about pH 8.0–8.5 and becomes corrosive below about pH 6.5.

(2) Bromine

Liquid bromine has also been used in the treatment of algae-infested cooling towers. However, bromine apparently has not received widespread commercial acceptance because of handling difficulties and the cost of bromination equipment.

(3) Chlorine Dioxide

Chlorine dioxide is usually classified as an oxidizing biocide although its kill mechanism is not oxidation. It is more effective at a higher pH or in nitrogen or organic contaminated systems than chlorine. Because it is an unstable compound, it is usually generated on-site with special equipment. It is also more expensive than chlorine.

(4) Chloroisocyanurates

Chloroisocyanurates are easily handled powdered compounds which hydrolyze in water to slowly release chlorine and cyanuric acid. However, they suffer all the drawbacks of chlorine in pH effectiveness ranges and present potential corrosion problems.

(5) Hypochlorites

Sodium and calcium hypochlorites function in much the same manner as chlorine gas in an easier to handle form. However, hypochlorites have all the disadvantages of chlorine plus a higher cost.

(6) Bromine Chloride and Bromine-chlorine Mixtures

Bromine chloride, available only as a liquid under pressure, has found some favor as a biocide. It hydrolyzes completely in dilute aqueous solutions to hypobromous acid (HOBr) and hydrochloric acid (HCl). The hypobromous acid is an effective, potent biocide for algae and bacteria. Bromine chloride has generally not been promoted for use on industrial recirculating cooling towers because of the high cost for feed equipment and accessories. Mixtures of bromines and chlorine have also been investigated as biocides. Such mixtures may be applied as a liquid/gas mixture or in the form of sodium hypochlorite and sodium hypobromite. It has been reported that a bromine/chlorine mixture displays greater biocide activity than bromine or chlorine alone. The costs of handling such mixtures have prohibited their widespread use.

While 1-bromo-3-chloro-5,5-dimethylhydantoin has been proposed for use in disinfecting swimming pools, well water, sewage effluent, and the like in L. O. Paterson U.S. Pat. Nos. 3,412,021 and 3,147,219, granted Nov. 19, 1968 and Sept. 1, 1964, respectively, BCDMH has not heretofore been employed to control biofouling in recirculating water systems. In accordance with this invention, it has been found that BCDMH is a highly effective biofouling control agent notwithstanding its inability to completely disinfect the bulk recirculating water at levels of administration that achieve biofouling control.

SUMMARY OF THE INVENTION

The present invention overcomes the disadvantages of the prior art by providing a novel method for treating biofouling problems inherent in recirculating water systems. Accordingly, the method of the present invention involves treating cooling towers and other water recirculating systems by introducing a biocidally effective amount of 1-bromo-3-chloro-5,5-dimethylhydantoin ("BCDMH") into the water in order to kill biofouling microorganisms at film forming surfaces of the system, and thereafter maintaining the concentration of BCDMH at a level sufficient to substantially reduce the regrowth of such microorganisms at such surfaces. Preferably BCDMH is provided at a daily level of at least about 0.005 pound per thousand gallons of water in the system.

By the present method, reduction in treatment costs (when compared to the prior art biocidal agents) may be achieved. Furthermore, the present invention displays an unexpected and markedly improved biocidal efficiency when compared to the prior art methods without the risks of toxicity and system corrosion attendant to the use of many prior art biocides and methods of use therefor.

Due to the nature of water cooling towers and recirculating systems in relation to microorganisms growth environments, it is necessary to provide a method of treating the recirculating water which, on the one hand, kills microorganisms adhering to the walls and other structures of the system and, on the other hand, substantially reduces the potential for microorganism regrowth.

DETAILED DESCRIPTION OF THE PREFERRED EMBODIMENTS

In accordance with the present invention, it has been discovered that 1-bromo-3-chloro-5,5-dimethylhydantoin ("BCDMH") effectively controls bacterial growth in cooling tower and water recirculating systems. The BCDMH has the following structural formula:

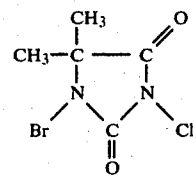

The method of the present invention involves the use of BCDMH as a biocidal agent for selectively controlling bacterial growth in cooling tower and water recirculating systems. Typically, BCDMH may be dissolved in the recirculating water of the system, as by simply introducing measured amounts of BCDMH into the water or by pre-mixing BCDMH in water and adding the resultant premixed solution to the recirculating system. Alternatively and preferably, BCDMH may be formed into pellets, rods or other agglomerates as described in L. O. Paterson U.S. Pat. No. 3,412,021, granted Nov. 19, 1968, with the agglomerates being suspended either directly in the recirculating water or in a reservoir through which the recirculating water is pumped. In all cases, the presence of BCDMH in the recirculating water acts as an effective biocide agent for controlling the growth of various bacteria on the surfaces of the recirculating water systems.

The amount of added BCDMH necessary for adequate bacterial growth control is dependent upon a number of factors, among which include the volume of the recirculating system and the temperature and pH of the water therein, the location of the system (i.e., is the system located in an area where bacterial nutrients may easily enter the system), quality of make-up water, and the amount of bacterial growth present at the time treatment is started.

Thus, for a new recirculating system one may easily control bacterial growth by simply adding an amount of BCDMH to the water and observing the results. That is, if after a period of time there is an observed built up of algae, etc., the amount of BCDMH should be increased. If there is no such build-up, the quantity of BCDMH added may be reduced until an accumulation of bacteria is noted, at which time the BCDMH level may be increased. Thus, through a series of "trial and error" tests the preferred quantity of BCDMH needed for biomass control for any system can be easily established.

Generally, BCDMH is provided in sufficient quantities so that at least about 0.005 pound BDCMH is provided daily per thousand gallons of water in the system. In determining the proper amount of BCDMH to be used, system volume is first ascertained. In the case of an open recirculating water system, system volume is normally calculated based on the amount of contained water plus daily make up for evaporation losses and daily blow down. Once the total volume is determined, the appropriate agent level may be selected, with the final level being optimized on a step-by-step basis in the described manner.

Preferably, BCDMH is provided at a level lying in the range of about 0.01 to about 0.02 pounds per thousand gallons per day. The benefits of this invention may be achieved with larger amounts of agent (e.g., at levels as high as 0.2 pound per 1000 gallons of water or higher) although such higher quantities are typically only required where the system is quite dirty and then only for a relatively short period of time (e.g., a few days to a few weeks). Ordinarily, biofouling is controlled without retaining a measurable halogen residual in the recirculating water and without complete destruction of all microorganisms in the bulk water phase.

In order to establish the effectiveness of BCDMH as a biocidal agent, a series of tests have been performed. These tests document the use of BCDMH in various sizes and types of cooling towers and water recirculating systems. Where practical, tests have been performed on similar cooling tower systems using chlorine as a biocide so that a comparison of biocidal effectiveness with that known biocide can be made.

Before detailing the numerous examples which establish the effectiveness of BCDMH as a biocidal agent, it is important to note that it has been discovered by the inventors that, unlike other water treatment environments such as swimming pools and the like, biocidal effectiveness in cooling tower and water recirculating systems is not dependent upon a complete biological kill of all microorganisms existing within the recirculating water. Rather, in cooling tower and water recirculating systems, it has been found in accordance with this invention that it is only necessary to substantially kill the microorganisms which adhere to the walls and other structural surfaces of the system. Once such localized organisms are killed, the total microorganism count in the recirculating water is essentially irrelevant to the efficacy of the water treatment method; that is, as long as the microorganisms are in circulation in the system (i.e., not adhering to the walls or other structural surfaces of the system), there is no noticeable detrimental effect on the heat-exchange capacity of the system.

As a result, the novel method of the present invention does not have as its objective the complete erradication of all microorganisms from the recirculating water but, instead, is intended to remove microorganism growth and biofilm from the surfaces of the recirculating water system. Thus, the term "biocidally effective" as used herein should be understood to refer to the selective attack on biofilmforming organisms located at system surfaces but should not be understood to mean the substantial elimination of bulk water phase microorganisms.

EXAMPLES

EXAMPLE 1

Oil Refinery Cooling Tower

Cooling Tower Contained Volume: 590,500 liters (156,000 gallons); Circulation Rate: 15,142 liters/minute (4,000 gpm); Nominal Cooling Capacity: 12,700,000 Kcal/hr (4,200 tons); Blow Down: 102 liters/minute (27 gpm).

This tower was previously continuously treated with 25 lbs/day chlorine until BCDMH treatment was started. By Day 13 of the BCDMH treatment, biological film growth began to loosen and slide down the structural beams of the tower. By Day 43, the tower was completely clean by visual observation and has remained so to date. Normal usage rate is 0.91 kg (2 lbs) per day of BCDMH (0.006 lb. BCDMH/1000 gal).

EXAMPLE 2

Oil Refinery Cooling Tower

A parallel tower very similar in size and service to the cooling tower of Example 1 was treated with chlorine. The physical description of this tower is: Contained Volume: 681,400 liters (180,000 gallons); Circulation Rate: 22,700 liters/minute (6,000 gpm); Nominal Cooling Capacity: 15,120,000 K-cal/hr (5,000 tons); Blow Down: 76-95 liters/minute (20-25 gpm). Biofouling treatment consisted of 18.14 kg/day (40 lbs/day) gaseous chlorine treatment.

This tower has remained visibly dirtier with more biological growth on tower packing than the tower of Example 1. The chlorine usage is approximately 20 times higher than the BCDMH consumption of the tower from Example 1.

It is interesting to note that the refinery where Examples 1 and 2 were conducted had been satisfied with the use of chlorine as a biocide until BCDMH was used on the tower of Example 1. When BCDMH was introduced into the Example 1, tower operating personnel determined that the previous 25 lbs/day typical chlorine dosage was not adequately controlling biofilm growth in the tower of Example 2 as well as 2 lbs/day BCDMH was controlling biofilm growth in the tower of Example 1. Chlorine dosage in the tower of Example 2 was raised to 40 lbs/day (average) in an attempt to match the visual appearance of the tower of Example 1, but this attempt was unsuccessful. No further increase in chlorine usage was attempted on the tower of Example 2 because of fear of delignification of the wood structures.

EXAMPLE 3

Packaged cooling Towers

Two packaged cooling towers were connected in parallel to provide the following system: Contained Volume: 37,800 liters (10,000 gallons); Circulation Rate: 7,600 liters/minute (2,000 gpm); Nominal Cooling Capacity: 2,420,000 Kcal/hr (800 tons); Blow Down: 344 liters/minute (91 gpm).

These towers had previously been treated with 50 ppm of a proprietary quaternary ammonium salt. This treatment caused the packing in these towers to badly foul with biofilm significantly reducing tower efficiency and finally requiring an annual replacement of the packing. In addition, the heat exchangers served by these towers had to be removed for cleaning at the rate of four to six per year due to waterside biological fouling.

BCDMH was compared to quaternary ammonium salt treatment in a week-on, week-off comparison test. The BCDMH proved to be clearly superior based on appearance and process performance and treatment was continued on BCDMH. No heat exchangers have plugged or fouled on the waterside since BCDMH has been used. In addition, the packing no longer has to be changed on a yearly basis. Normal BCDMH usage for these towers is 0.91 kg (2 lbs) per day (0.01 lb/1000 gal).

EXAMPLE 4

Single Cooling Tower

Contained Volume: 56,800 liters (15,000 gallons); Circulation Rate: 4,500 liters/minute (1,200 gpm);

Nominal Cooling Capacity: 2,120,000 Kcal/hr (700 tons); Blow Down: 38 liters/minute (10 gpm).

This tower was in service five days before BCDMH treatment began. A thick biofilm fouling layer had built up on the open deck before treatment. This biofilm was killed within a week of starting BCDMH addition to the tower. The biofilm layer on the deck was completely controlled after 37 days of treatment. Normal BCDMH usage rate is 0.45 kg (1 lb) per day (0.01 lb/1000 gal).

EXAMPLE 5

Hospital Cooling Tower

A hospital tower used to operate centrifugal chillers was treated with BCDMH. The characteristics of this tower are: Contained Volume: 41,600 liters (11,000 gal); Circulation Rate: 12,500 liters/minute (3,300 gpm); Nominal Cooling Capacity: 3,628,800 Kcal/hr (1,200 tons); Blow Down: 19 liters/minute (5 gpm).

The tower is located next to the hospital parking lot. At the time of this test new construction was on-going at the hospital. The dust and dirt had caused problems in the lines and in the chiller itself. The hospital had difficulty maintaining its chilled water system at 7° C. (45° F.).

After 5 days of BCDMH treatment, with no other changes in operation or in chemical treatment, the hospital obtained 5° C. (41° F.) chilled water out of the centrifugal units.

It is theorized that the biofilm, in addition to trapping microorganisms, trapped dirt and silt in a heavily loaded system, giving almost the same effect as a scaled system from the standpoint of heat exchange.

The system has remained clean with a usage rate of 0.27 kg/day (0.6 lbs/day) of BCDMH (0.01 lb/1000 gal).

EXAMPLE 6

Oil Refinery Condenser Tower

A large tower used to cool the water for as a barometric condenser was treated with BCDMH. The characteristics of this tower are: Contained Volume: 416,400 liters (110,000 gal); Circulation Rate: 24,600 liters/minute (6,500 gpm); Nominal Cooling Capacity: 16,330,000 Kcal/hr (5,400 tons); Blow Down: 150 liters/minute (40 gpm).

This tower's water was saturated with the light crude oils pulled from the barometric condenser of a vacuum stripping tower. It was visually apparent that the tower was infested with slime-forming fungi and bacteria. There were large stringy growths from 25 to 100 mm (1 inch to 4 inch) long hanging from the fill and structural members, and a solid biomass on the sides that was about 19 mm (¾ inch) thick. Repeated efforts to remove the growth with commercial biocides proved unsuccessful.

Two days after BCDMH treatment was started large biomass deposits were observed sliding down structural members or dropping into the basin. By Day 13 the system was estimated to be 50% to 60% clean, and bare wood was visible. Some areas on the sides, limited by lack of water flow, remained spotty with the biomass. In the past, the temperature range of the system limited the vacuum tower throughout. With BCDMH throughput increased substantially. The usage rate has been approximately 2.7 kg/day (6 lbs/day) (0.02 lb/1000 gal).

EXAMPLE 7

Large Gas Processor

A mechanical draft tower used in process was treated with BCDMH. The characteristics of this tower are: Contained Volume: 208,000 liters (55,000 gal); Circulation Rate: 22,700 liters/minute (6,000 gpm); Nominal Cooling Capacity: 16,632,000 Kcal/hr (5,500 tons); Blow Down: 91 liters/minute (24 gpm).

Large masses of algae growth were present in the tower. This tower had been treated with quaternary ammonium salts, with organo-tin and organo-sulfur biocides, alternating every three days. Such treatment proved unsuccessful. New process equipment had been added to the plant and management was considering buying a new tower to obtain the necessary heat transfer capacity.

BCDMH was started at a usage rate of 0.8 kg/day (1¾ lbs/day) (0.01 lb/1000 gal). Within three days there was a significant increase in heat transfer as indicated by an increase in the tower Δ T of 3.9° C. (7° F.) At the end of two weeks the tower Δ T had stabilized at 10.6° C. (19° F.)—an increase of 5.6° C. (10° F.), but the algae growth had not diminished appreciably. The dosage was increased to 1.4 kg/day (3 lbs/day) (0.02 lb/1000 gal) and within 24 hours there was evidence of algae kill. On Day 21 it was reported that 70% to 80% of the algae had been killed, and the operators returned to a usage rate of 0.91 kg/day (2 lbs/day) (0.01 lb/1000 gal).

EXAMPLE 8

Chemical Plant

A plant rendering animal fat to basic chemicals was treated with BCDMH. The packaged open recirculating tower used in the process water cooling has the following characteristics: Contained volume: (18,900 liters (5,000 gal); Circulation Rate: 3,634 liters/minute (960 gpm); Nominal Cooling Capacity: 1,512,000 Kcal/hr (500 tons); Blow Down: 25 liters/minute (6.5 gpm).

This tower was highly contaminated with visible biomass. There was almost no air flow through the tower. The tower inlet temperature was 77.8° C. (172° F.) and the outlet water temperature was 75.0° C. (168° F.)

BCDMH in the amount of 2.3 kg (5 lbs) (0.2 lb/1000 gal) was suspended in a mesh bag close to the suction of the circulating pump. Within two days large sections of biomass broke loose resulting in a plugging of the distribution deck and the line filter screens. The tower was cleaned manually for the next 24 hours.

After five days the tower appeared clean with no visible biomass. One week after the tower was put on BCDMH the tower inlet temperature was 33.3° C. (92° F.) and the outlet water temperature was 26.7° C. (80° F.), substantially increasing production. Normal usage rate is now averaging 0.23 kg/day (0.5 lbs/day) (0.02 lb/1000 gal).

Table I presents a summary of the Examples set forth herein in which BCDMH was used as the biocidal agent.

As previously noted, there currently exist several methods for determining biocidal effectiveness. The appearance and microorganisms count methods, discussed above, were utilized herein to develop a comparison between the effectiveness of chlorine treatment to that of BCDMH treatment. The results of this comparison are noted in Table II. Table II establishes that towers with high bacterial counts (e.g., Example 1) are visibly cleaner after treatment with BCDMH than towers with lower bacteria counts (e.g., Example 2) treated with chlorine. Accordingly, this comparison demonstrates that it is not necessary to attempt to kill the total microorganism population in the recirculating water in order to achieve adequate biofouling control.

croorganisms. The usage, or dose, level of BCDMH, measured in terms of the total volume of each cooling tower system tested, is reported in Table I.

Extensive corrosion tests establish that BCDMH is, from a corrosivity standpoint, comparable to chlorine. These tests indicate that the corrosion rates of structural components, such as metals and wood exposed to BCDMH in cooling water systems containing corrosion

TABLE I

SUMMARY OF EXAMPLES

| Examples | Contained Volume (gallons) | Daily Evaporation (gallons) | Daily Blow Down (gallons) | Total* Volume (gallons) | BCDMH Daily Usage | Usage/Total Volume (lb/1000 gals) |
|---|---|---|---|---|---|---|
| 1 | 156,000 | 115,200 | 38,400 | 309,600 | 2.00 | 0.006 lb/M gal. |
| 3 | 10,000 | 43,200 | 131,000 | 184,200 | 2.00 | 0.01 lb/M gal. |
| 4 | 15,000 | 17,300 | 14,400 | 46,700 | 1.00** | 0.02 lb/M gal. |
| 5 | 11,000 | 38,000 | 7,600 | 56,600 | 0.06 | 0.01 lb/M gal. |
| 6 | 110,000 | 140,400 | 57,000 | 307,400 | 6.00** | 0.02 lb/M gal. |
| 7 | 55,000 | 86,400 | 34,500 | 175,900 | 2.00 | 0.01 lb/M gal. |
| 8 | 5,000 | 13,800 | 9,200 | 28,000 | 0.50** | 0.02 lb/M gal. |

*TOTAL VOLUME = CONTAINED VOLUME + DAILY EVAPORATION + DAILY BLOW DOWN
**CLEAN-UP DOSAGE inhibitors is comparable to the corrosion rates estab-

TABLE II

SUMMARY - TOTAL BACTERIA COUNT-COMPARISON TO TOWER CONDITION

| Tower | Test Days | Self-Contained Biological Test Filter (Colonies/ml) Average | Range | Standard Lab Plate Method (Colonies/ml) Average | Range | Appearance of Tower Condition | Treatment |
|---|---|---|---|---|---|---|---|
| Example 1 | 37 | 107M | 1–300M | 40M | 25–55M | All areas of the tower which contact water are clean. | BCDMH |
| Example 2 | 37 | 65M | 0.03–350M | 38M | 0–138M | Visible biological growth even in high water contact areas. Build-ups of biological growth are forming on straight sections of packing away from joints which provide support. | Gaseous Chlorine |
| Example 3 | 26 | 68M | 19–100M | | | No biological growth on high water contact areas in tower. Algae growth in low contact areas around the outside of the tower. | BCDMH |
| Example 4 | 14 | 60M | 47–96M | | | All areas in contact with water are clean. Occasional small amount of algae growth on open distribution deck. Normally, no algae growth on deck despite exposure to sunlight. | BCDMH |

As previously noted, once initial biofouling control has been achieved it is possible, on a step-by-step basis, to determine a level of BCDMH which is satisfactory to substantially reduce the regrowth of the biological microorganisms.

lished for chlorine. The corrosion data are set forth in Table III. From the data set forth in Table III, it is noted that BCDMH is less corrosive than chlorine.

TABLE III

CORROSION DATA - CHROMATE INHIBITOR SYSTEM

| Structural Material | COOLING TOWER CORROSION (BCDMH Treated 2 lbs/day) | | | COOLING TOWER CORROSION (Chlorine Treated 40 lbs/day) | | |
|---|---|---|---|---|---|---|
| | 7 Days | 31 Days | 31 Days | 7 Days | 31 Days | 31 Days |
| Copper | 0.0063 mm/yr (0.25 mils/yr) | 0.0185 mm/yr (0.73 mils/yr) | 0.0066 mm/yr (0.26 mils/yr) | 0.0137 mm/yr (0.54 mils/yr) | 0.0165 mm/yr (0.65 mils/yr) | 0.00 mm/yr (0.00 mils/yr) |
| 304 Stainless Steel | 0.0046 mm/yr (0.18 mils/yr) | 0.0010 mm/yr (0.04 mils/yr) | 0.00 mm/yr (0.00 mils/yr) | 0.0025 mm/yr (0.10 mils/yr) | 0.0069 mm/yr (0.27 mils/yr) | 0.0229 mm/yr (0.090 mils/yr) |
| Mild Steel | 0.0210 mm/yr (0.87 mils/yr) | 0.0048 mm/yr (0.19 mils/yr) | 0.0201 mm/yr (0.79 mils/yr) | 0.0307 mm/yr (1.21 mils/yr) | 0.0137 mm/yr (0.54 mils/yr) | 0.1166 mm/yr (4.59 mils/yr) |
| Aluminum Bronze | 0.00 mm/yr (0.00 mils/yr) | 0.330 mm/yr (1.30 mils/yr) | 0.0053 mm/yr (0.21 mils/yr) | 0.008 mm/yr (0.03 mils/yr) | 0.0942 mm/yr (3.56 mils/yr) | 0.00 mm/yr (0.00 mils/yr) |
| Aluminum | 0.0271 mm/yr (1.09 mils/yr) | 0.056 mm/yr (2.21 mils/yr) | 0.0198 mm/yr (0.78 mils/yr) | 0.1798 mm/yr (7.08 mils/yr) | 0.0183 mm/yr (0.76 mils/yr) | 0.0030 mm/yr (0.12 mils/yr) |
| Galvanized Steel | 0.0718 mm/yr (2.96 mils/yr) | — | 0.045 mm/yr (1.77 mils/yr) | 0.1478 mm/yr (5.82 mils/yr) | — | 0.994 mm/yr (3.91 mils/yr) |
| Admiralty Brass | — | — | 0.0043 mm/yr (0.17 mils/yr) | — | — | 0.00 mm/yr (0.00 mils/yr) |
| Cedar | The wood is fuzzy but not soft or spongy. There are | The wood is a little soft. There is some | — | The wood is much more fuzzy than No. 6 Cooling Twr wood. | The wood is much more fuzzy than No. 6 Cooling Twr wood. The | — |

TABLE III-continued

| | CORROSION DATA - CHROMATE INHIBITOR SYSTEM | | | | | |
|---|---|---|---|---|---|---|
| Structural | COOLING TOWER CORROSION (BCDMH Treated 2 lbs/day) | | | COOLING TOWER CORROSION (Chlorine Treated 40 lbs/day) | | |
| Material | 7 Days | 31 Days | 31 Days | 7 Days | 31 Days | 31 Days |
| Redwood | small chips in the wood. The wood is slightly slimy, probably due to an oil leak that occurred during this time period. The wood is slightly fuzzy but not significantly changed from initial appearance. | splintering and the wood is slightly fuzzy. The wood is dirty. It is slightly fuzzy and a little spongy. There is little or no splintering of wood. | — | The wood is not spongy or soft but does have some brown patches on it. The wood has streaks on the side. There is some colored mold or algae growing on the sides. The wood is light in color and fuzzy. It is a little softer. | wood is soft and spongy. There are many brown patches on the wood. The wood is very light in color and is quite fuzzy. The wood is spongy and soft. | — |

BCDMH has also been compared to the common biocidal agents in terms of desired performance characteristics as shown in Table IV. As will be noted from Table IV, BCDMH is the only biocide which displays favorable properties for all of the characteristics tested.

TABLE IV

| PRODUCT PERFORMANCE CHARACTERISTICS VERSUS IDEAL BIOCIDE | | | | | | | | | | | |
|---|---|---|---|---|---|---|---|---|---|---|---|
| | Organo-Tins | Organo-Sulfurs | Copper Salts | Quaternary Ammonium Salts | Chlorophenates | DBNPA | $Cl_2$ | Hypochlorites or Chloro-Isocyanurates | $ClO_2$ | BrCl | BCDMH |
| Wide Kill Spectrum (Variety of organisms) | no | no | no (algae only) | yes | yes | yes | yes | yes | yes | yes | yes |
| Fast Rate of Kill (less than 30 mins) | no | no | yes | no | yes | yes | yes | yes | yes | yes | yes |
| Cost Performance Efficiency | fair | poor | good | poor | fair | good | good | good | good | good | good |
| Wide pH use Range | yes | no | yes | no | yes | no | no | no | yes | yes | yes |
| Non-Corrosive | yes | yes | no | yes | yes | yes | yes | no | no | no | yes |
| Compatibility (with scale and corrosion inhibitors) | yes | yes | yes | no (polyelectrolytes) | yes | yes | yes | yes | yes | ? | yes |
| Easy to Control and Handle | yes | yes | yes | yes | yes | yes | no | yes | no | no | yes |
| General EPA Approval | yes | yes | yes | yes | ? (under study) | yes | yes | yes | yes | yes | yes |
| Non-Foaming | yes | yes | yes | no | no | yes | yes | yes | yes | yes | yes |
| Insensitive to Organic or Nitrogen Contamination | yes | yes | yes | no | yes | yes | no | no | yes | yes | yes |

From the foregoing it can be seen that the present invention may be performed by introducing quantities of BCDMH to the water of a cooling tower or recirculating system in order to kill the biological microorganisms adhering to the walls, or other surfaces, of the tower or system. Thereafter, the concentration of BCDMH is maintained at a level sufficient to substantially reduce the regrowth of such microorganisms.

While the foregoing has been described with respect to a preferred embodiment and alternatives thereto, one skilled in the art should realize that modifications and changes may be made to the foregoing while still falling within the intent and scope of the present invention. All such modifications and changes should be considered a part hereof.

What is claimed is:

1. A method of controlling biofouling in recirculating water systems for heat exchange systems without disinfecting the bulk recirculating water comprising the steps of:

introducing a biocidally effective amount of 1-bromo-3-chloro-5,5-dimethylhydantoin into the water in order to kill biofouling microorganisms at film-forming surfaces of the system; and thereafter maintaining the concentration of 1-bromo-3-chloro-5,5-dimethylhydantoin at a level effective to inhibit regrowth of such microorganisms at such surfaces without maintaining a continuous measurable halogen residual in the recirculating water and without disinfecting the bulk recirculating water.

2. A method, as claimed in claim 1, wherein the 1-bromo-3-chloro-5,5-dimethylhydantoin is introduced at a daily level of at least about 0.005 pound per thousand gallons of water in the system.

3. A method, as claimed in claim 1, wherein the 1-bromo-3-chloro-5,5-dimethylhydantoin is provided at a daily level of about 0.01–0.02 pound per thousand gallons of water in the system.

4. A method, as claimed in claim 1, wherein the 1-bromo-3-chloro-5,5-dimethylhydanotoin is introduced in agglomerate form.

5. A method, as claimed in claim 1, wherein the recirculating water system is a cooling tower.

6. A method, as claimed in claim 1, wherein the recirculating water system is an air-conditioning system.

* * * * *

UNITED STATES PATENT AND TRADEMARK OFFICE
CERTIFICATE OF CORRECTION

PATENT NO. : 4,297,224
DATED : October 27, 1981
INVENTOR(S) : Nick T. Macchiarolo, et al.

It is certified that error appears in the above-identified patent and that said Letters Patent are hereby corrected as shown below:

Column 2, line 57, "foreging" should read --foregoing--.

Column 9, line 66, "throughout" should read --throughput--.

Column 10, line 37, "(18,900" should read --18,900--.

Table I, column headed BCDMH Daily Usage, "0.06" should read --0.60--.

Signed and Sealed this

Twenty-sixth Day of January 1982

[SEAL]

Attest:

Attesting Officer

GERALD J. MOSSINGHOFF

Commissioner of Patents and Trademarks